(12) United States Patent
Harward

(10) Patent No.: US 9,012,003 B2
(45) Date of Patent: *Apr. 21, 2015

(54) REINFORCED FABRIC SEAM

(71) Applicant: Patagonia, Inc., Ventura, CA (US)

(72) Inventor: Randy Harward, Ojai, CA (US)

(73) Assignee: Patagonia, Inc., Ventura, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/960,154

(22) Filed: Aug. 6, 2013

(65) Prior Publication Data

US 2013/0316119 A1    Nov. 28, 2013

Related U.S. Application Data

(63) Continuation of application No. 10/906,392, filed on Feb. 17, 2005, now Pat. No. 8,518,511.

(60) Provisional application No. 60/578,760, filed on Jun. 9, 2004.

(51) Int. Cl.
*A41D 27/24* (2006.01)
*A41H 43/04* (2006.01)
(Continued)

(52) U.S. Cl.
CPC ........... *A41D 27/24* (2013.01); *A41D 27/245* (2013.01); *A41H 43/04* (2013.01); *B29C 65/08* (2013.01); *B29C 65/5021* (2013.01); *B29C 65/5042* (2013.01); *B29C 66/1142* (2013.01); *B29C 66/43* (2013.01); *B29C 66/729* (2013.01); *B29K 2313/00* (2013.01); *B32B 7/12* (2013.01); *B32B 27/12* (2013.01); *D06H 5/00* (2013.01);

(Continued)

(58) Field of Classification Search
USPC ........................................ 428/57, 38, 53, 189
See application file for complete search history.

(56) References Cited

U.S. PATENT DOCUMENTS 3,615,994 A * 10/1971 MacLaine et al. ............ 156/159
3,819,437 A     6/1974 Paine
(Continued)

FOREIGN PATENT DOCUMENTS

DE    37 10 037 A1    10/1988
JP    50-18064 A      1/1993
(Continued)

OTHER PUBLICATIONS

International Search Report, dated Jul. 20, 2006 and mailed Sep. 5, 2006, Corresponding to PCT/US05/20422, (3 pp.).

(Continued)

*Primary Examiner* — Brent O'Hern
(74) *Attorney, Agent, or Firm* — Christie, Parker & Hale, LLP

(57) ABSTRACT

A composite seam system including a narrow weld bead joining two panels of fabric and a seam tape applied thereon. The applied seam tape comprises a top layer, a reinforcing layer and an adhesive layer melted through the reinforcing layer and connecting the top layer to the fabric panels over the weld bead. The narrow weld bead and the small seam allowance of the fabric panels it joins allows the seam tape to be secured over the weld bead to the fabric panels while lying in a flat plane. The use of a narrow reinforcing layer of woven polyester, nylon or non-woven ultra-fine fibrous material in the seam tape allows the seam tape to be flexible enough to move with the fabric it joins, reducing the incidence of tape edge abrasion.

31 Claims, 3 Drawing Sheets

(51) Int. Cl.
  *B29C 65/08* (2006.01)
  *B29C 65/50* (2006.01)
  *B29C 65/00* (2006.01)
  *B32B 7/12* (2006.01)
  *B32B 27/12* (2006.01)
  *D06H 5/00* (2006.01)
  *D06M 10/02* (2006.01)
  *D06M 17/00* (2006.01)
  *D06M 17/04* (2006.01)
  *D06M 23/18* (2006.01)
  *B29C 65/48* (2006.01)

(52) U.S. Cl.
  CPC ............. *D06M10/02* (2013.01); *D06M 17/00* (2013.01); *D06M 17/04* (2013.01); *D06M 23/18* (2013.01); *B29C 65/5028* (2013.01); *B29C 65/48* (2013.01); *B29C 65/4815* (2013.01); *B29C 65/483* (2013.01); *B29C 65/4835* (2013.01)

(56) References Cited

U.S. PATENT DOCUMENTS

| | | | |
|---|---|---|---|
| 4,152,473 A | | 5/1979 | Layman |
| 4,737,213 A * | | 4/1988 | Paeglis et al. ............... 156/157 |
| 4,775,581 A | | 10/1988 | Siniscalchi |
| 5,260,113 A * | | 11/1993 | Pontuti et al. ................ 428/61 |
| 5,320,698 A | | 6/1994 | Fournier et al. |
| 5,322,724 A | | 6/1994 | Levens |
| 5,472,755 A | | 12/1995 | Nibling, Jr. |
| 5,595,804 A * | | 1/1997 | Korbel ........................ 428/57 |
| 5,682,618 A | | 11/1997 | Johnson et al. |
| 5,687,523 A | | 11/1997 | Stough |
| 5,691,051 A * | | 11/1997 | Matthews .................... 428/354 |
| 5,824,175 A | | 10/1998 | Hoopengardner |
| 5,885,679 A | | 3/1999 | Yasue et al. |
| 6,048,810 A * | | 4/2000 | Baychar ....................... 442/370 |
| 6,103,325 A | | 8/2000 | Zins et al. |
| 6,124,032 A | | 9/2000 | Bloch et al. |
| 6,180,318 B1 * | | 1/2001 | Fitzer et al. ................. 430/292 |
| 6,187,131 B1 | | 2/2001 | Wenzel |
| 6,471,803 B1 | | 10/2002 | Pelland et al. |
| 6,497,934 B1 | | 12/2002 | Mahn, Jr. et al. |
| 6,517,651 B2 | | 2/2003 | Azulay |
| 6,521,067 B1 * | | 2/2003 | Clark .......................... 156/73.1 |
| 6,622,312 B2 | | 9/2003 | Rabinowicz |
| 6,649,251 B1 | | 11/2003 | Druecke et al. |
| 8,518,511 B2 * | | 8/2013 | Harward ........................ 428/57 |
| 2002/0022126 A1 | | 2/2002 | Lodde |
| 2002/0172792 A1 | | 11/2002 | Jarvis et al. |
| 2003/0010439 A1 | | 1/2003 | Fenton |
| 2003/0044563 A1 * | | 3/2003 | Kocinec et al. ................ 428/63 |
| 2003/0087090 A1 | | 5/2003 | Carbonare |
| 2004/0221942 A1 | | 11/2004 | Yu et al. |
| 2005/0022920 A1 | | 2/2005 | Fowler |
| 2005/0066486 A1 | | 3/2005 | Wood et al. |

FOREIGN PATENT DOCUMENTS

| | | |
|---|---|---|
| JP | 61-18074 A | 4/1994 |
| JP | 2000-160472 A | 6/2000 |
| WO | WO 01/60602 A1 | 8/2001 |
| WO | WO 2005/122806 A3 | 12/2005 |

OTHER PUBLICATIONS

Written Opinion of the International Searching Authority, dated Jul. 20, 2006 and mailed Sep. 5, 2006, Corresponding to PCT/US05/20422, (6 pp.).

European Patent Office; Supplemental European Search Report dated Dec. 28, 2010, for European Application No. 05760212; 3 Pages.

English Translation of JP 61-16396; Applicant Toray Industries, Inc.; Published on Jan. 30, 1986.

English Translation of JP 61-18074; Applicant Toko Kasen Kogyo K.K.; Published on Feb. 22, 1986.

English Translation of Japanese Office action dated Dec. 3, 2010 (mailed Dec. 6, 2010), for Japanese Application No. 2007-527759 (Appeal No. 2010-16981).

English Translation of Japanese Office action dated Apr. 1, 2011 (mailed Apr. 4, 2011), for Japanese Application No. 2007-527759 (Appeal No. 2010-16981).

\* cited by examiner

PRIOR ART

FIG. 5
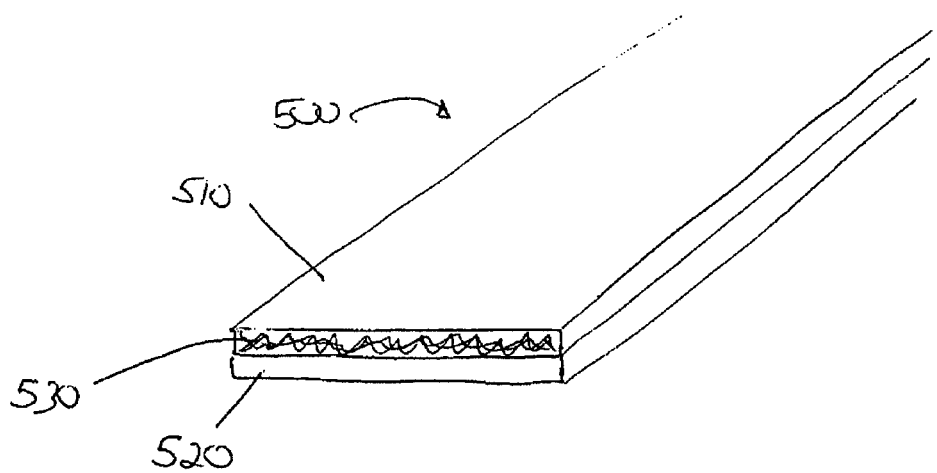
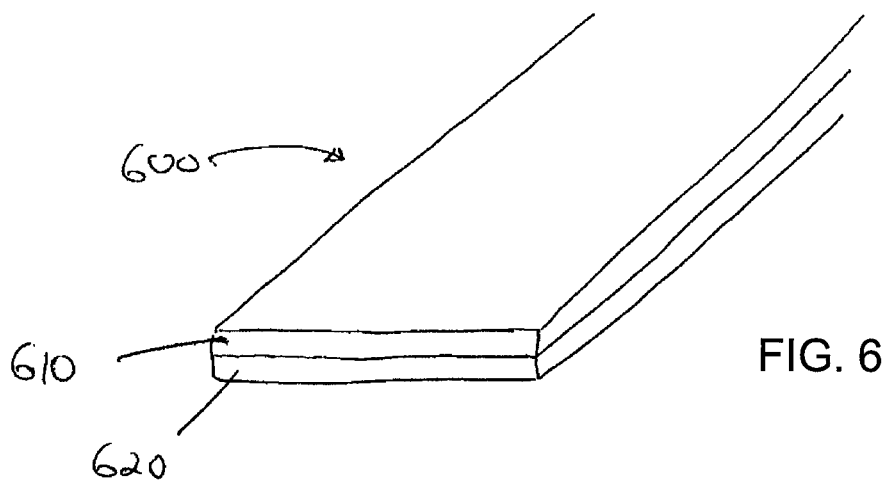
FIG. 6

REINFORCED FABRIC SEAM

CROSS-REFERENCE TO RELATED APPLICATION(S)

This application is a continuation of U.S. application Ser. No. 10/906,392, filed Feb. 17, 2005, issued on Aug. 27, 2013, as U.S. Pat. No. 8,518,511, which claims the benefit of U.S. Provisional Patent Application No. 60/578,760, filed Jun. 9, 2004. The entire content is incorporated by reference herein.

BACKGROUND OF THE INVENTION

Garments designed for the outerwear market can be divided into several main categories including hard shell and soft shell garments respectively. In general, hard shell garments may be distinguished by the inclusion of a waterproofing barrier such as an applied coat of urethane. While soft shell garments can include tightly woven fabrics giving the garment a measure of water repellency, they are generally not completely waterproof. Fleeces having soft fabric which is generally of a knit construction are also used in the outerwear market, and these too are normally not waterproof to the degree that hard shell garments are. Because hard shell garments are used during athletic and outdoor activities, it is desirable that they be light, rugged, have good waterproof characteristics and feature a moisture transfer membrane or the like for moisture management. In addition, from the manufacturer's point of view it is desirable that these garments be relatively simple to manufacture.

The method of joining panels of fabric to assemble a complete garment can be just as important to that garment's overall characteristics as the type of fabric used in that garment. While several prior art methods exist for forming seams in hard shell garments, each has its drawbacks. Simple threaded stitching, while commonly used in the garment industry, is problematic in hard shell garments because a completed stitch leaves a bulky seam in the otherwise lightweight fabric of a hard shell garment. Furthermore, the passage of the needle through the fabric of the garment compromises the waterproof nature of the fabric, necessitating the application of a seam tape secured with an adhesive over the stitched seam to ensure a waterproof seal.

However, gluing a length of seam tape over the stitched seam creates a new problem. Namely, a sewn and taped seam tends to be rather stiff. The differential in stiffness between the taped seam formed by this process and the lightweight fabric joined by the sewn and taped seam leads to a phenomenon known as edge abrasion.

Because the region of the seam is much bulkier than the fabric panel which it joins, it causes a region of wear to build up just at the point where the fabric panel meets the taped seam. The continual flexing of the loose fabric against the stiff edge of the taped seam and any external abrasion causes the fabric to wear through at that point, reducing the life of an otherwise serviceable garment.

Alternatively, manufacturers have employed adhesives to join panels of fabric in a "stitchless" garment. Typically, what is known as a lap seam is made when two pieces of fabric are precut and overlapped. The pieces are secured with an adhesive applied in the area of overlap, which in some instances may require heating to fully interlock with the fibers of the fabric pieces.

However, the fabrics used in hard shell garments are usually either very tightly woven and/or have a durable water repellent ("DWR") finish applied to the fabric surface to provide waterproofing for the fabric. A fair amount of adhesive must be applied to find purchase and make a bond of sufficient strength with a fabric having such a weave or finish, making the overall seam that much stiffer once the adhesive has solidified. As such, this method of stitchless garment construction can create an even stiffer seam than that of the sewn and taped seam described above, and so garments constructed with this process can suffer from the problem of edge abrasion to an even greater degree. Also, some fabrics cannot be reliably bonded in this manner and can fail in use.

SUMMARY OF THE INVENTION

In an ideal shell garment the region of the seam, while maintaining the waterproof nature of the panels of fabric joined thereby, is no more stiff than these panels. As such, the garment as a whole is able to flow and flex evenly while worn and areas of wear do not concentrate along the seams. When a lap glued seam or seam tape secured with a large amount of adhesive is employed, the garment diverges considerably from this ideal. The present composite seam system features a lighter, softer seam construction having significantly less bulk which reduces the tape edge abrasion problem considerably.

The present composite seam system may be used to join various types of hard shell fabrics. In alternative embodiments, the present composite seam system may be used to join synthetic woven fabrics, non-woven fabrics, or knit fabrics including fleeces. In alternative embodiments, these fabrics may be provided with water resistant or waterproof laminates or coatings, and may include a tricot scrim laminated to the face of the fabric.

In one embodiment, the layered fabrics to be joined in the composite seam are first secured to each other with a weld bead. The weld bead is used to tack the two panels of fabric in place for the later application of a length of seam tape, and/or to protect the edges of the fabric panels from wear once the taped seam is in place. Because the edges of the two joined fabric panels are joined by the weld bead and any seam allowance remaining thereafter is located beneath the taped seam, the edges of the fabric are subjected to very little wear and thus maintain their integrity. Shell garments seamed with just a glued lap joint are prone to experiencing abrasion and unraveling of the exposed edges of their fabrics.

In another embodiment, the composite seam system includes a very narrow sonic weld bead joining two panels of fabric, and a seam tape applied thereon. The applied seam tape comprises a top layer, a reinforcing layer and an adhesive melted through the reinforcing layer and connecting the top layer to the fabric panels over the sonic weld bead. The narrow sonic weld bead and the small seam allowance of the fabric panels it joins allows the seam tape to be secured over the sonic weld bead to the fabric panels while lying in a flat plane. This, coupled with the inelasticity of the seam tape across its width provides a completed seam that evenly transfers force through the seam tape from one fabric panel to the next without allowing a substantial portion of that force to be transferred to the sonic weld bead.

The inelasticity of the seam tape is dependent in part on the materials comprising the reinforcing layer used in between the sonic weld bead and the top layer. This reinforcing layer can be a woven polyester, nylon or non-woven ultra-fine fibrous material sufficiently inelastic across its width to prevent the tape from stretching when subjected to a transverse load.

In an exemplary embodiment of the present composite seam system, the seam tape used has the same modulus of elasticity both across its width and along its length. In an alternative embodiment, the seam tape is provided with a lower modulus of elasticity along its length than across its width. This will allow the seam tape to stretch along its length. The seam tape may need to bend around corners and/or pass through angles when being applied to the garment, and a seam tape that had no give along its length would be difficult to apply under these circumstances.

The narrow sonic weld bead, small seam allowance, and the materials used in the seam tape provide a relatively thin seam tape that is less stiff, which accordingly reduces the incidence of tape abrasion for the completed seam.

In another embodiment, a composite seam system used for joining two pieces of fabric includes two pieces of fabric fused together at a seam and a seam tape laid over the seam and covering a portion of each of the two pieces of fabric. The seam tape in turn comprises a reinforcing layer, a top layer laid over the reinforcing layer, and an adhesive bonded to the top layer and passing through fibers of the reinforcing layer to attach to the two pieces of fabric. In an alternative embodiment, the seam tape is dimensionally stable so as to take up substantially the full load applied across the seam. For example, the seam tape comprises a top layer and an adhesive secured to the top layer, wherein the seam tape is dimensionally stable. The seam may also be a sonic weld bead, e.g., less than about one millimeter in width.

In another embodiment, the invention includes a particularly narrow seam tape as described herein, for example between about six to about eleven millimeters wide. In yet another embodiment, the invention includes a seam tape as described herein having a reinforcing layer below a top layer.

BRIEF DESCRIPTION OF THE DRAWINGS

FIG. 5 is an isometric view of an alternative embodiment of a seam tape for use in the present composite seam system.

FIG. 6 is an isometric view of a further alternative embodiment of a seam tape for use in the present composite seam system.

Figure 1:
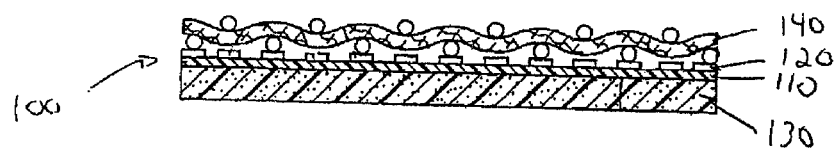
FIG. 1 is a cross-sectional longitudinal view of a prior art seam tape.

Before any embodiment of the invention is explained in detail it is to be understood that the invention is not limited in its application to the exemplary details of construction and arrangements of components set forth in the following description or illustrated in the drawings. The invention is capable of alternative embodiments and of being practiced or being carried out in various ways. Also, it is to be understood that the terminology used herein is for the purpose of illustrative description and should not be regarded as limiting.

DETAILED DESCRIPTION OF THE INVENTION

With reference to FIG. 1, a cross-sectional longitudinal view is shown of a prior art seam tape 100 having a polyurethane layer 110 and an adhesive layer 130 secured below it. On the opposite side of the polyurethane layer 110 is provided an adhesive 120. This adhesive 120 secures a knit tricot layer 140 to the polyurethane layer 110. While this knit tricot layer 140 provides abrasion resistance for the seam tape 100, it is rather elastic, having a modulus of elasticity of less than 1,900 psi and so cannot add much strength to a completed seam.

Figure 2:
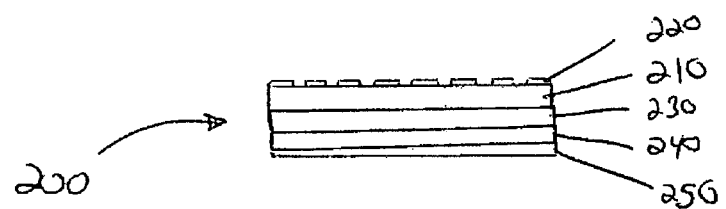
FIG. 2 is a cross-sectional end view of a seam tape for use with the present composite seam system.

In contrast, FIG. 2 shows a seam tape 200 for use with the present seam system. The seam tape 200 is a multi-layer construction and includes a top layer 210, an adhesive layer 230 and a reinforcing layer 240.

The top layer 210 is in various alternative embodiments a urethane laminate, mylar, polyester or any flexible plastic material. The top layer 210 is provided for strength, abrasion resistance, and waterproofing purposes. In an exemplary embodiment, the top layer 210 is between twenty and fifty microns thick.

Below the top layer 210 is an adhesive layer 230. In one embodiment, this adhesive layer 230 is chemically bonded and chemically compatible with the top layer 210. Accordingly, in an exemplary embodiment if the top layer is a urethane laminate, the adhesive layer comprises a thermoplastic urethane layer. In an exemplary embodiment, the adhesive layer 230 is between seventy and one hundred forty microns thick.

Below the adhesive layer 230 is a reinforcing layer 240. In various alternative embodiments, the reinforcing layer 240 comprises woven polyester, nylon, kevlar or another material sufficiently inelastic across its width so that the seam tape 200 as a whole exhibits substantially no strain across its width when subjected to loads caused by normal wear. In an exemplary embodiment, the reinforcing layer 240 is between one hundred and one hundred fifty microns thick. In a more particular exemplary embodiment, the reinforcing layer 240 may be a 30d×30d polyester weave with a count of 96×96 yarns per inch.

In an alternative embodiment, the reinforcing layer 240 need not be as wide as the other layers of the seam tape 200. As such, the seam tape 200 can be made even thinner and less stiff at its edges, further reducing the incidence of tape edge abrasion in the present composite seam system. Very narrow seam tapes 200 and reinforcing layers 240 can be used in the present composite seam system. In one embodiment, the seam tape 200 is six millimeters wide and the reinforcing layer 240 is four and a half up to about six millimeters wide. In another embodiment, the seam tape 200 is nine millimeters wide and the reinforcing layer 240 is six up to about nine millimeters wide. In yet another embodiment, the seam tape 200 is eleven millimeters wide and the reinforcing layer 240 is six up to about eleven millimeters wide.

In an alternative embodiment, the seam tape 200 may be provided with a backing paper 250 covering the reinforcing layer 240 to protect it up until the point at which the seam tape 200 is ready to be applied over a sonic weld bead. At this point the backing paper 250 can be removed and discarded. In an additional alternative embodiment, the seam tape 200 can be provided with a hydrophilic layer 220 on the top layer 210. This hydrophilic layer 220 is preferably a pattern of material printed on the top layer 210. This hydrophilic layer 220 creates an uneven surface which helps moisture move along the surface of the seam tape 200.

The seam tape 200 is shown before application to a garment. As will be shown in the following figures, the arrangement of the layers of the seam tape 200 changes as the seam tape 200 is bonded with another material. Specifically, heat is applied to the seam tape 200 to melt the adhesive layer 230 causing it to flow through the reinforcing layer 240 and interact with the material to which the seam tape 200 is applied.

Figure 3:
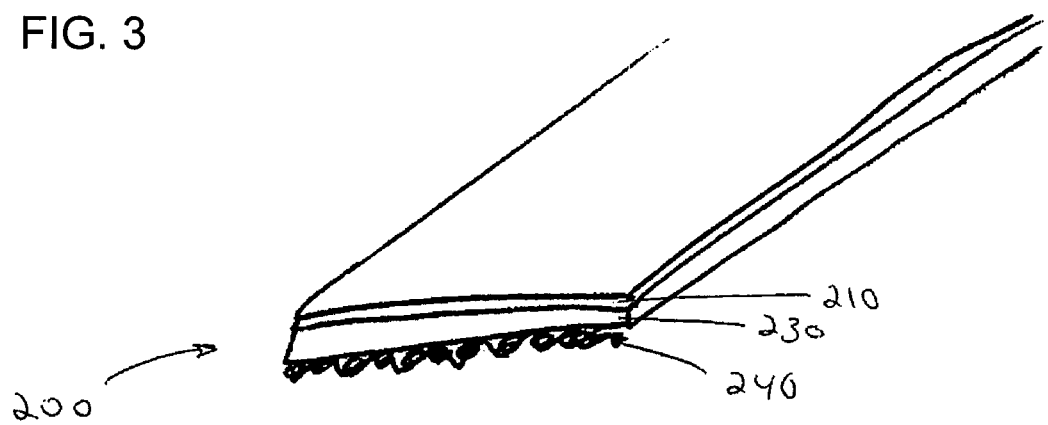
FIG. 3 is an isometric view of the seam tape of FIG. 2.

With reference to FIG. 3, an isometric view of the seam tape 200 is shown having a top layer 210, an adhesive layer 230, and a reinforcing layer 240, but without the hydrophilic layer 220 or the backing paper 250.

Figure 4:
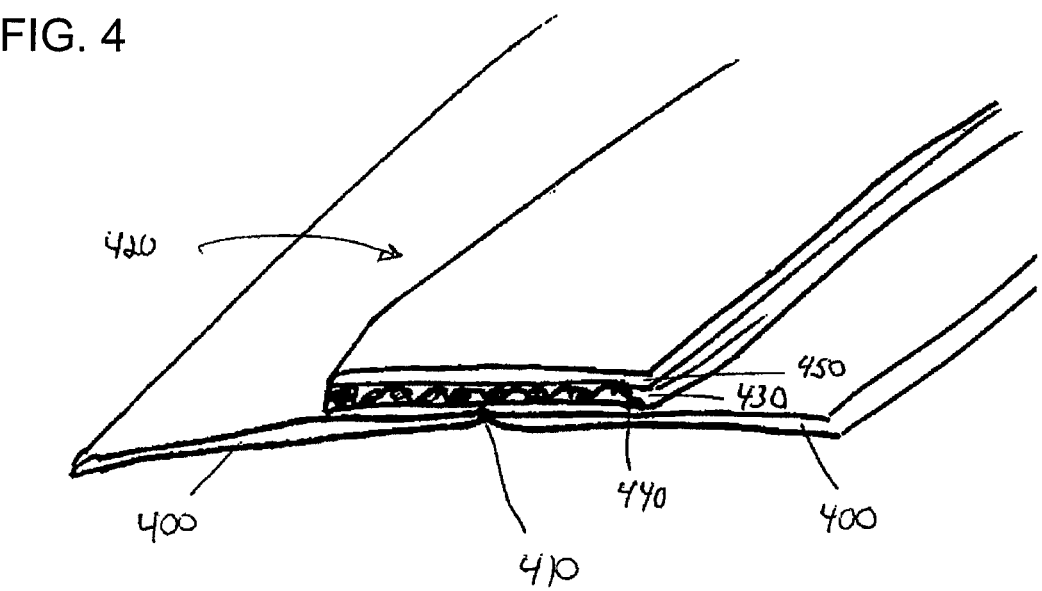
FIG. 4 is an isometric view of the present composite seam system showing a seam tape securing two fabric panels.

With reference to FIG. 4, an isometric view of the present composite seam system shows a seam tape 420 securing two fabric panels 400. In an exemplary embodiment, the fabric panels 400 comprise three layers. An outer layer comprises a lightweight rip stop nylon or polyester. This outer layer provides the panel 400 with strength as well as abrasion resistance and water repellency. The outer layer may include a DWR finish to provide water repellency for the fabric panel 400.

A middle layer comprises a urethane laminate, a layer of polyester or the like. This middle layer is provided to enable the transport of moisture away from the skin of the user, and for additional waterproofing. An inside layer is preferably provided by a pattern of a hydrophilic material printed on the middle layer. This pattern of hydrophilic material creates an uneven surface which helps moisture move along the inside of the fabric; the side that would contact a user's skin. Otherwise, this moisture tends to bead up, causing the fabric to feel clammy and stick to a user's skin. Alternatively this bottom layer can be a lightweight polyester or nylon mesh fabric, or tricot. This layer adds durability while serving the same function of moisture movement.

The fabric panels 400 as a whole are fairly light. In an exemplary embodiment, the fabric panels 400 are comprised of a material weighing between one and ten ounces per square yard. In an alternative embodiment, the fabric panels 400 are comprised of a material weighing about 1.9 ounces per square yard. In a further alternative embodiment, the fabric panels 400 are comprised of a material weighing about 2.4 ounces per square yard.

The fabric panels 400 are fused together at their edges by a sonic weld bead 410. In an exemplary embodiment, a commercially available sonic welder may be used to provide the sonic weld bead 410. The sonic welder may be used with a head having integral welding and cutting functions. The sonic weld bead 410 is formed as the head of the sonic welder passes high frequency waves through the fabric panels 400 to be joined. These waves vibrate the fabric panels 400, creating heat through the friction of one fabric panel 400 on the other. The sonic welding process essentially melts or otherwise fuses the edges of the fabrics together. The head of the welder may comprise a wheel having a profile thereon which determines the width of the sonic weld bead 410 made, as well as being made sharper on one side so that extraneous portions of the fabric panels 400 are trimmed off on the waste side of the sonic weld bead 410 at the time the sonic weld bead 410 is made. In an exemplary embodiment of the present invention, the width of the sonic weld bead 410 itself is very small, preferably about one millimeter or less. In a further exemplary embodiment, little or no seam allowance remains beside the sonic weld bead 410 after its formation.

By this process, the edges of the two fabric panels 400 have been sealed together. The sonic weld bead 410 is not necessarily waterproof, nor is it strong enough alone to hold the fabric panels 400 together under normal wear. Accordingly, a seam tape 420 may be applied over the sonic weld bead 410 to make up for these shortcomings. In addition to ensuring that the cut edges of fabric panels 400 that do still remain along the seam allowance above the sonic weld bead 410 will be hidden under this tape, the sonic weld bead 410 also holds the panels of fabric panels 400 in position during manufacture to allow the seam tape 420 to be properly applied.

The seam tape 420 may be applied over the sonic weld bead 410 using commercially available machines. As mentioned above, in an exemplary embodiment, the seam tape 420 comprises multiple layers. A top layer 450 is provided of urethane laminate, mylar, polyester or any flexible plastic material for abrasion resistance and to give the seam tape 420 some mechanical stability. The top layer 450 may also have printed thereon a hydrophilic material to aid in moisture transport and to improve the surface feel of the seam tape 420.

Beneath the top layer 450 an adhesive layer 430 is applied. The adhesive layer 430 may be chemically bonded to the top layer 450 of the seam tape 420. In a preferred embodiment, the adhesive layer 430 is chemically compatible with the top layer 450 to aid in this bond. For example, if the top layer 450 were a urethane layer, the adhesive layer 430 may be a thermoplastic urethane ("TPU") layer. If the top layer 450 were a polyester layer the adhesive layer 430 may comprise a thermosetting polyester. In a further preferred embodiment, the top layer 450, adhesive layer 430 and the top surface of the fabric panels 400 are all chemically compatible, for example, each may be comprised of urethane based materials.

A reinforcing layer 440 is provided below the adhesive layer 430. Some prior art seam tapes have been provided for waterproofing purposes only, or to the extent that a reinforcement was used it comprised a knit tricot layer located on the outside of the seam tape. Knit tricot is a relatively stretchy material and as such, would not provide the seam tape 420 with the strength necessary to shelter the sonic weld bead 410 from higher transverse tensile forces across the seam tape 420. To this end, the seam tape 420 comprises a reinforcing layer 440 of woven polyester, nylon, kevlar or another material affording the seam tape 420 a high modulus of elasticity.

In one embodiment, the seam tape 420 has a modulus of elasticity at least 5,000 psi and a breaking strength of at least 15 pounds per linear inch. In another embodiment, the seam tape 420 has a modulus of at least 10,000 psi and a breaking strength of at least 20 pounds per linear inch. As such, the seam tape 420 as a whole exhibits substantially no strain across its width when subjected to loads caused by normal wear. The reinforcing layer 440 allows the seam tape 420 to evenly take up substantially all the load applied across the seam when the two fabric panels 400 are pulled apart, shielding the sonic weld bead 410 from experiencing the majority of this load. In other words, substantially the entire load applied across the seam is taken up by the seam tape. One skilled in the art would understand that if the load is too great for the seam tape causing the seam tape to stretch or fail, then at least more than a minimal portion of the load would transfer across the seam. Thus, at least the seam tape initially takes up substantially all of the load across the seam. In other words, at least initially substantially all of the load applied across the seam goes through the seam tape.

In an alternative embodiment, the reinforcing layer 440 need not be a woven material, rather it may be comprised of a microfiber material, such as any of the microfiber materials disclosed in U.S. Pat. No. 6,048,810 to Baychar (incorporated herein by reference).

In an alternative embodiment, the adhesive layer 430 may be provided below the reinforcing layer 440, which in turn is provided below the top layer 450. In another alternative embodiment shown in FIG. 5, a seam tape 500 includes a reinforcing layer 530 embedded within a top layer 510. An adhesive layer 520 is below the reinforcing layer 530.

In yet another alternative embodiment shown in FIG. 6, the seam tape 600 includes a top layer 610 and an adhesive layer 620. The top layer 610 is comprised of a dimensionally stable oriented polymer of a similar elasticity to the reinforcing layers 440 and 530 of previous embodiments. As such, this embodiment dispenses with the need for a separate reinforcing layer entirely. Alternatively, a separate reinforcing layer can remain and be comprised of the dimensionally stable oriented polymer mentioned above.

In one embodiment of the present composite seam system, when the seam tape 420 is applied over the fabric panels 400 and heated, the adhesive layer 430 melts and a portion of the adhesive runs through the reinforcing layer 440 and onto or into the surface of the fabric panels 400 to secure thereto and/or interlock therein. In this manner the adhesive layer 430 may provide a contiguous bond between the fabric panels 400 and both the top layer 450 and the reinforcing layer 440. The bond formed creates a waterproof seal and is sufficiently strong to allow the seam tape 420 to take up substantially all of a transverse load applied across the fabric panels 400.

In a preferred embodiment, the seam tape 420 sits flat against the fabric panels 400. Were the seam tape 420 to sit high on the fabric panels 400 in a domed position, there would be some amount of give to the seam as seam tape 420 flattened out under the application of a tensile load across the seam. This would have the similar effect to providing a highly elastic material for the reinforcing layer 440 such as knit tricot or the like.

This bit of give to the seam tape 420 could allow a substantial portion of that load to transfer to the sonic weld bead 410 as it took up the slack caused by the high position of the seam tape 420. This load could potentially cause the sonic weld bead 410 to fail, exposing the edges of the fabric panels 400 joined thereby to abrasion and wear.

This flat profile is made possible both by the lightweight reinforcing layer 440 and the other materials comprising the seam tape 420, and by the method used to form the sonic weld bead 410. In a preferred embodiment, the sonic weld bead 410 is formed by a sonic welder having a head which provides a sonic weld bead 410 of one millimeter or less, and which concurrently trims off substantially all of the seam allowance. In an alternative embodiment for use with heavier fabric panels 400 a two millimeter wide sonic weld bead 410 is provided and a seam allowance of two millimeters is provided to ensure that the sonic weld bead 410 lies flat against the fabric panels 400.

What is claimed is:

1. A composite seam system comprising:
   two pieces of fabric fused together at a seam; and
   a seam tape laid over the seam and covering a portion of each of the two pieces of fabric, the seam tape comprising:
      a reinforcing layer;
      a top layer laid over the reinforcing layer, said top layer being wider than the reinforcing layer; and
      an adhesive secured to the top layer and passing through the reinforcing layer to contact the two pieces of fabric to attach the seam tape to the two pieces of fabric, wherein said seam tape has a breaking strength of at least 15 lbs. per linear inch, wherein the seam tape is capable of at least initially taking up substantially all of a load applied across said seam when said two pieces of fabric are pulled apart substantially shielding at least initially the seam from said load.

2. The system of claim 1, wherein the seam tape is dimensionally stable.

3. The system of claim 1, wherein the seam is a sonic weld bead.

4. The system of claim 3, wherein the weld bead is less than about one millimeter in width.

5. The system of claim 1, wherein the adhesive is chemically bonded with the top layer.

6. The system of claim 1, wherein the adhesive is chemically compatible with both the top layer and the two pieces of fabric.

7. The system of claim 1, further comprising a pattern of hydrophilic material on the top layer.

8. The system of claim 1, wherein the top layer is a urethane layer.

9. The system of claim 8, wherein the adhesive is a thermoplastic urethane adhesive.

10. The system of claim 1, wherein the top layer is a polyester layer.

11. The system of claim 10, wherein the adhesive is a thermosetting polyester adhesive.

12. The system of claim 1, wherein the reinforcing layer is a woven polyester layer.

13. The system of claim 1, wherein the reinforcing layer is a woven nylon layer.

14. The system of claim 1, wherein the reinforcing layer comprises a non-woven ultra-fine fibrous material.

15. The system of claim 1, wherein the seam tape is less than about eleven millimeters wide.

16. The system of claim 1, wherein the seam tape has a modulus of elasticity of at least 5000 psi.

17. The system of claim 1, wherein the two pieces of fabric have at least one of a waterproof laminate and a waterproof coated construction.

18. The system of claim 1, wherein the seam tape has a modulus of elasticity of at least 10000 psi.

19. The system of claim 18, wherein the seam tape has a breaking strength of at least 20 lbs. per linear inch.

20. The system of claim 1, wherein the seam tape has a breaking strength of at least 20 lbs. per linear inch.

21. A composite seam system comprising:
   two pieces of fabric fused together at a seam; and
   a seam tape laid over the seam and covering a portion of each of the two pieces of fabric, the seam tape comprising:
      a top layer including a reinforcing layer embedded within the top layer, said top layer being wider than the reinforcing layer; and
      an adhesive secured to the top layer and the two pieces of fabric;
      wherein said seam tape has a breaking strength of at least 15 lbs. per linear inch, wherein the seam tape is capable of at least initially taking up substantially all of a load appllied across said seam when said two pieces of fabric are pulled apart substantially shielding at least initially the seam from said load.

22. The system of claim 21, wherein the seam is a sonic weld bead.

23. The system of claim 22, wherein the sonic weld bead is less than about one millimeter in width.

24. The system of claim 21, wherein the adhesive is chemically bonded with the top layer.

25. The system of claim 21, wherein the seam tape has a modulus of elasticity of at least 10000 psi.

26. The system of claim 25, wherein the seam tape has a breaking strength of at least 20 lbs. per linear inch.

27. The system of claim 21, wherein the seam tape has a breaking strength of at least 20 lbs. per linear inch.

28. The system of claim 21, wherein the seam tape has a modulus of elasticity of at least 5000 psi.

29. A composite seam system comprising:
   two pieces of fabric fused together at a seam; and
   a seam tape laid over the seam and covering a portion of each of the two pieces of fabric, the seam tape comprising:
      a reinforcing layer;
      a top layer laid over the reinforcing layer, said top layer being wider than the reinforcing layer; and
      an adhesive secured to the top layer and passing through the reinforcing layer to contact the two pieces of fabric to attach the seam tape to the two pieces of fabric, wherein said seam tape is capable of at least initially taking up substantially all of a load applied across said seam when said two pieces of fabric are pulled apart.

30. A composite seam system comprising:
two pieces of fabric fused together at a seam; and
a seam tape laid over the seam and covering a portion of each of the two pieces of fabric, the seam tape comprising:
  a top layer including a reinforcing layer embedded within the top layer, said top layer being wider than the reinforcing layer; and
  an adhesive secured to the top layer and the two pieces of fabric;
wherein said seam tape is capable of at least initially taking up substantially all of a load applied across said seam when said two pieces of fabric are pulled apart substantially shielding at least initially the seam from said load.

31. The system of claim 30, wherein the seam tape is dimensionally stable.

\* \* \* \* \*